US009648481B2

(12) United States Patent
Grice et al.

(10) Patent No.: US 9,648,481 B2
(45) Date of Patent: May 9, 2017

(54) CALLING A RESPONSE PROVIDER BASED ON DETECTION OF AN EMERGENCY SITUATION

(71) Applicant: LENOVO ENTERPRISE SOLUTIONS (SINGAPORE) PTE. LTD., Singapore (SG)

(72) Inventors: Jonathan K. Grice, Raleigh, NC (US); Alper S. Gurdal, Raleigh, NC (US); Emil P. Parker, Youngsville, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/868,653

(22) Filed: Sep. 29, 2015

(65) Prior Publication Data
US 2017/0094488 A1 Mar. 30, 2017

(51) Int. Cl.
*H04W 4/22* (2009.01)
*G08B 25/01* (2006.01)
(52) U.S. Cl.
CPC ............ *H04W 4/22* (2013.01); *G08B 25/016* (2013.01)
(58) Field of Classification Search
CPC ....... H04W 4/22; H04W 4/02; H04W 76/007; H04W 4/025; G08B 25/016; G08B 25/10; G08B 21/02; G08B 21/0205; G08B 21/0446; G08B 21/06; G08B 21/0453; G08B 27/00; G08B 29/185
USPC .......................................... 455/404.1, 404.2
See application file for complete search history.

(56) References Cited

U.S. PATENT DOCUMENTS

| 7,126,472 | B2 * | 10/2006 | Kraus | G08B 25/016 340/286.02 |
| 2013/0278414 | A1 * | 10/2013 | Sprigg | G08B 21/0453 340/539.12 |
| 2016/0093197 | A1 * | 3/2016 | See | G08B 25/10 340/539.12 |

OTHER PUBLICATIONS

Rouse, "Smartphone App Promises to Make Emergency Calls Automatically", HJnews.com (online), Sep. 21, 2010, 3 pages, The Herald Journal, Logan, Utah, USA, URL: news.hjnews.com/features/smartphone-app-promises-to-make-emergency-calls-automatically/article_1edfa9f8-c5d1-11df-8c8a-001cc4c002e0.html.

* cited by examiner

*Primary Examiner* — Magdi Elhag
(74) *Attorney, Agent, or Firm* — Brandon C. Kennedy; Douglas W. Robinson; Kennedy Lenart Spraggins LLP

(57) ABSTRACT

Calling a response provider based on detection of an emergency situation includes: receiving sensor data describing at least one characteristic of physical surroundings of a computing device; receiving biometric data for a user of the computing device; selecting, in dependence upon the biometric data and the sensor data, a profile of trigger data from among a plurality of profiles of trigger data; determining that the sensor data and the biometric data satisfy a threshold criterion of the profile of trigger data for activating a response trigger; and in response to the determination, activating the response trigger, including automatically and without the user's intervention: establishing a connection to an emergency response provider; and providing information describing the user to the emergency response provider.

16 Claims, 8 Drawing Sheets

CALLING A RESPONSE PROVIDER BASED ON DETECTION OF AN EMERGENCY SITUATION

BACKGROUND OF THE INVENTION

Field of the Invention

The field of the invention is data processing, or, more specifically, methods, computing devices, and products for calling a response provider based on detection of an emergency situation.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Mobile computing devices have also become prevalent in the everyday life of a vast majority of people. Most mobile computing devices include various technical features capable of collecting information about environmental factors, including biometric data for a user. However, most mobile computing devices require a user to perform multiple steps before a telephone call may be made, which may become a problem in an emergency situation when a user is either incapable of making a telephone call, or the user is in a stressful situation making a standard telephone call more difficult or impossible.

SUMMARY

Methods, computing devices and products for calling a response provider based on detection of an emergency situation are disclosed in this specification. Calling a response provider based on detection of an emergency situation may include: receiving sensor data describing at least one characteristic of physical surroundings of the computing device; receiving biometric data for a user of the computing device; selecting, in dependence upon the biometric data and the sensor data, a profile of trigger data from among multiple profiles of trigger data; determining that the sensor data and the biometric data satisfy a threshold criterion of the profile of trigger data for activating a response trigger; and in response to the determination, activating the response trigger, including automatically and without the user's intervention: establishing a connection to an emergency response provider; and providing information describing the user to the emergency response provider.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
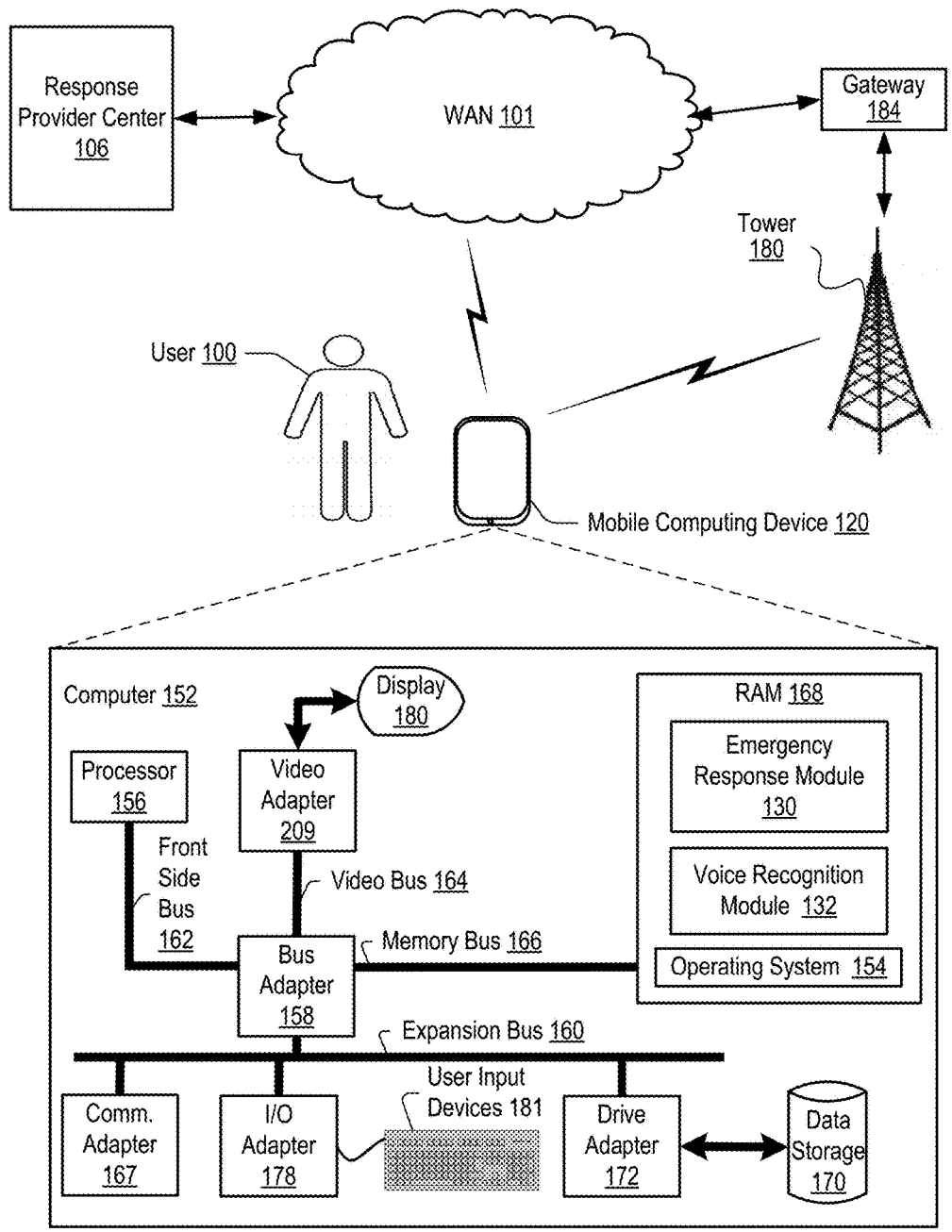
FIG. 1 illustrates an example computing environment including an example implementation of an emergency response module within a mobile computing device.

Exemplary methods, computing devices, and products for calling a response provider based on detection of an emergency situation are described with reference to the accompanying drawings, beginning with FIG. 1. FIG. 1 sets forth a network diagram of a system configured for calling a response provider based on detection of an emergency situation according to embodiments of the present invention. The system of FIG. 1 includes an example of automated computing machinery comprising an exemplary mobile computing device (120). A 'mobile computing device' as the term is used in this specification refers to a portable electronic device such as a cellular telephone, a tablet, or any other type of electronic device. In the example of FIG. 1, the mobile computing device is also referred to as a computer (152) configured for calling a response provider based on detection of an emergency situation according to embodiments of the present invention. As such, throughout the description of FIG. 1, the terms 'mobile computing device (120)' and 'computer (152)' may be utilized synonymously. The computer (152) of FIG. 1 includes at least one computer processor (156) or 'CPU' as well as random access memory (168) ('RAM') which is connected through a bush such as a high speed memory bus (166) and bus adapter (158) to processor (156) and to other components of the computer (152).

Stored in RAM (168) is an emergency response module (130), which may be a module of computer program instructions for calling a response provider based on detection of an emergency situation. The emergency response module (130) may carry out calling a response provider based on detection of an emergency situation by receiving sensor data describing at least one characteristic of physical surroundings of a mobile computing device (120). Also stored in RAM (168) is a voice recognition module (132) for analyzing and identifying words, phrases, and/or semantic meaning.

The mobile computing device (120) may include a number of sensors. Such sensors may be configured to capture data representing a physical environment of the mobile computing device and, thus, the user. Examples of such sensors include proximity sensors, force detection sensors on a display of the mobile computing device, motion sensors, a pedometer, an accelerometer, a light sensor, a compass, and a force sensor, among others.

The mobile computing device (120) may also include a camera, video camera, or microphone that may be used to capture or record video or audio information of the physical surroundings of the mobile computing device. In other embodiments, different types of information describing the physical surroundings of a user may be gathered by the mobile computing device.

The emergency response module (130) may also receive biometric data for a user of the computing device. In some implementations, biometric data may include a heartbeat, body temperature, glucose levels, and adrenaline levels, among others. Generally, biometric data may include any information that may be recorded or detected about a user, whether the biometric data is gathered directly by the mobile computing device or received from another device capable of detecting and transmitting biometric or physiological data about the user to the mobile computing device.

The example emergency response module (130) of FIG. 1 may also select, in dependence upon the biometric data and the sensor data, a profile of trigger data from among a plurality of profiles of trigger data. A given profile of trigger data may include information for specifying at which levels or quantities different measurements of sensor and biometric data are sufficient to satisfy a threshold level or quantity for activating a trigger. In some cases, a given profile of trigger data may only specify threshold criteria based on data from one or more sensors and one or more particular types of biometric data. More generally, a profile may include multiple trigger definitions that correspond, respectively, to multiple types of sensor data. In other words, for multiple sensors, there may be a mapping from a given sensor data to a particular trigger condition that is appropriate to the given sensor data. For example, if the sensor data is a temperature reading of the user, then the mapped trigger definition within the profile for the user may be a temperature reading above which emergency actions may be taken, or below which emergency actions may be taken—in other words, in some cases, for a single given sensor data in the profile, there may be multiple mapped trigger conditions. In some examples, responsive to activation of a trigger, different steps or combinations of steps may be performed by the emergency response module (130).

Further in some embodiments, a profile of trigger data may be specified according to a type of activity. In some cases, a profile of trigger data may be defined to specify a trigger based on an activity, such as riding a bicycle, running, walking, or some other activity being engaged in by a user. In other cases, a profile of trigger data may be defined to specify a trigger based on a geographic location.

The emergency response module (130) may also determine that the sensor data and the biometric data satisfy a threshold criterion of the profile of trigger data for activating a response trigger. For example, a medical condition profile of trigger data for a user with diabetes may define a threshold criterion for glucose levels to be a particular amount such that if a glucose levels exceeds the particular amount, the emergency response module (130) may activate a response trigger, where activation of the response trigger may invoke a call to an emergency response provider. In this example, the mobile computing device may receive the glucose level information from a glucose monitor device that reads glucose levels for the user. In different cases, different profiles of trigger data may define levels or quantities such that if sensor data or biometric data exceeds the defined levels or quantities for the given profile of trigger data, then the response trigger may be activated.

In response to determining that the sensor and biometric data satisfy the threshold criterion, the emergency response module (130) may activate the response trigger. Activating the response trigger may be carried out automatically and without the user's intervention. Such activation may include establishing a connection to an emergency response provider and providing information describing the user to the emergency response provider. In some cases, establishing a connection may include making a telephone call to an emergency response provider, such as a 911 call to emergency services. In other examples, establishing a connection may include sending a text message, e-mail message, video message, or other type of message over some other communication channel to a response provider. Further, in some cases, an emergency response provider may include multiple different emergency response providers. For example, an emergency response provider may be a nursing station at an elder care facility, a particular doctor, or a combination of one or multiple emergency response providers. In some cases, a user may define contact information for designating a particular emergency response provider.

Also stored in RAM (168) is an operating system (154). Operating systems useful in computers configured for calling a response provider based on detection of an emergency situation according to embodiments of the present invention include UNIX™ Linux™ Microsoft WINDOWS™ AIX™ IBM's i5/OS™ and others as will occur to those of skill in the art. The operating system (154) and emergency response module (130) in the example of FIG. 1 are shown in RAM (168), but many components of such software typically are stored in non-volatile memory also, such as, for example, on a disk storage (170).

The computer (152) of FIG. 1 includes a disk drive adapter (172) coupled through expansion bus (160) and bus adapter (158) to processor (156) and other components of the computer (152). The disk drive adapter (172) connects non-volatile data storage to the computer (152) in the form of disk drive (170). Disk drive adapters useful in computers configured for calling a response provider based on detection of an emergency situation according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. The video adapter (209) is connected to the processor (156) through a high speed video bus (164), a bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through, for example, RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for calling a response provider based on detection of an emergency situation according to embodiments of the present invention include modems for wired dial-up communications, Ethernet (IEEE 802.3) adapters for wired data communications, and 802.11 adapters for wireless data communications.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

The example mobile computing device (120) may receive information from Global Positioning System (GPS) satellites, Wi-Fi base stations, and cell towers (180). Further, the mobile computing device (120) may also send information to the cell tower (180) for establishing a telephone call, where the cell tower (180) may communicate with a gateway (184). In this example, the gateway (184) may transmit and receive data and messages to a response provider center (106), over a wide-area network (WAN) (101).

Figure 2:
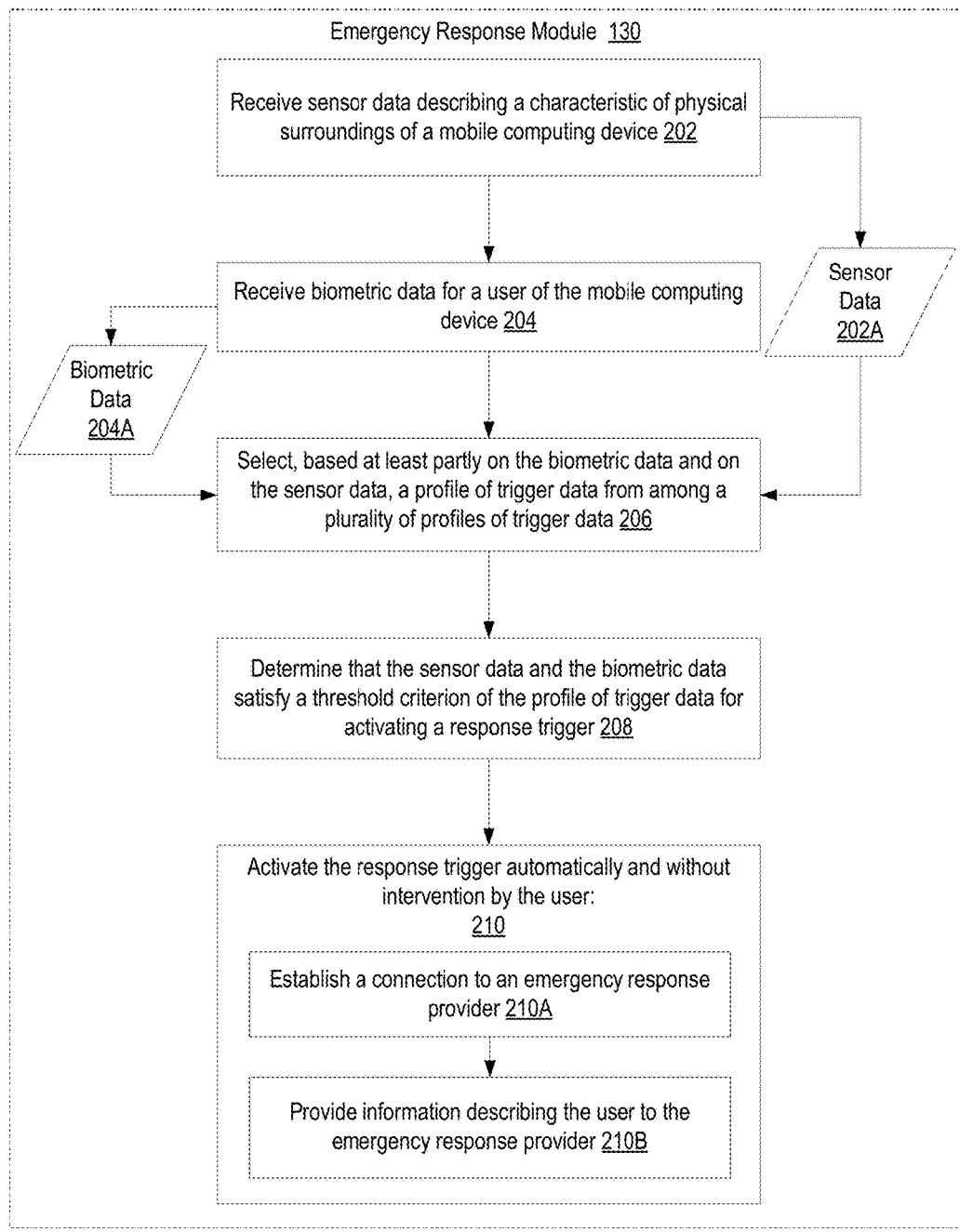
FIG. 2 illustrates a flowchart describing example method of calling a response provider based on detection of an emergency situation according to embodiments of the present invention.

For further explanation, FIG. 2 sets forth a flow chart illustrating an exemplary method for calling a response provider based on detection of an emergency situation according to embodiments of the present invention. The method of FIG. 2 may be carried out by a module of computer program instructions in the form of an emergency response module (130) executed by a processor of a mobile device (120 in FIG. 1). The method of FIG. 2 includes receiving (202) sensor data describing at least one characteristic of physical surroundings of the mobile computing device. Receiving (202) sensor data (202A) may be carried out by receiving or retrieving such data from various sensors of the computing device or sensors coupled for data communications to the computing devices. Such sensors may include GPS sensors, temperature sensors, altimeter sensors, accelerometers, impact sensors, compasses, and the like.

Emergency response module (130) also includes receiving (204) biometric data (204A) for a user of the mobile computing device. Receiving (204) biometric data may be carried out in a variety of ways including, for example, by receiving biometric data from devices that may be worn by the user, connected to the user, or implanted in the user. In other examples, the mobile computing device (120) may directly read different forms of biometric data for the user.

The method of FIG. 2 also includes selecting (206), by the emergency response module (130) in dependence upon the biometric data (204A) and the sensor data (202A), a profile of trigger data from among a plurality of profiles of trigger data. In some implementations, selecting (206) a profile of trigger data may include determining, in dependence upon the sensor data, a type of activity being engaged in by the user and selecting a profile of trigger data corresponding to the activity type determined. In other cases, selecting (206) a profile of trigger data may include using the sensor data (202A) to determine a geographic location of the mobile computing device, and correspondingly, the user. The emergency response module (130) may then determine a risk level associated with that geographic region. For example, the emergency response module (130) of the mobile computing device (120) may communicate with a data analytics service to request crime data for the geographic region, and if the level of crime is above a certain threshold, the emergency response module (130) may select a profile of trigger data where triggers may correspond to the identification of different dangerous scenarios. Further in this example, if the level of crime is above a certain threshold, the emergency response module (130) may vocalize a warning to the user, or generate a text message, generate a beep or noise, or generate some other indication of a warning.

Further, the emergency response module (130) may also enter a ready state to activate the gathering of data describing the surrounding environment. For example, the emergency response module (130) may activate a voice recognition module (132 in FIG. 1) to listen for and recognize one or more phrases indicative of a threat to safety for the user. For example, the emergency response module (130) may use the voice recognition module to identify that the phrases "give me your money," "give me your purse," or some other phrase indicative of possible criminal activity. In this example, identification of such a phrase may satisfy a threshold criterion for a dangerous situation.

In other implementations, the emergency response module (130) may begin gathering environmental data based on determining other emergency situations. For example, the emergency response module (130) may determine that a user has fallen down, and in response to determining the fall, the emergency response module (130) may activate the voice recognition module (132). At such point, if the user vocalizes a word or phrase that indicates an emergency situation, the emergency response module (130) may activate a response trigger. For example, the voice recognition module (132) may recognize the word "help." In other cases, the user may provide an emergency phrase in a user profile that may not be associated with an emergency situation, such as "typewriter," and upon recognizing the word, the emergency response module (130) may activate a response trigger for making an emergency call.

Emergency response module (130) also includes determining (208) that the sensor data (202A) and the biometric data (204A) satisfy a threshold criterion of the profile of trigger data for activating a response trigger. To continue the above example, identification of the phrase may serve to satisfy a threshold criterion of a profile of trigger data based on geographic data. Further in this example, if in addition to satisfying the threshold criterion based on the sensor data (202A), the emergency response module (130) may also use biometric data to determine that a threshold criterion for a walking activity profile of trigger data has been satisfied. For example, if a user has a walking heart rate of 90 beats per minute, and suddenly, while still walking, the user's walking heart rate increases to 180 beats per minute, then the emergency response module (130) may determine that a threshold criterion for activating a response trigger has been satisfied. In this example, the emergency response module (130) may determine that the user was walking because the user has maintained an average speed between 3 and 5 miles per hour as measured by a mobile computing device sensor or based on GPS data.

In response to determining (208) that the sensor data and the biometric data satisfy the threshold criterion of the profile of trigger data, the method of FIG. 2 continues by activating (210) the response trigger. Activating (210) the response trigger may be carried out automatically and without the user's intervention. In the method of FIG. 2, activating (210) the response trigger includes establishing (210A) a connection to an emergency response provider and providing (210B) information describing the user to the emergency response provider. In this example, connection may be to a 911 call center, and the information describing the user may include the geographic location of the user and information describing that the user is the victim of a criminal act.

Establishing (210A) a connection to an emergency response provider may be carried out by different techniques and over different communication channels. For example, mobile computing device (120) may establish a telephone call over a cellular telephone network or over a Wi-Fi or other type of wireless network. Further, multiple different communication channels may be used to communicate the information describing the user. Once connected, the emergency response module (138) may provide (210B) information describing the user to the emergency response provider. Providing (210B) such information describing the user may include, in some examples, communicating or transmitting the information to the emergency response provider by generating a computer vocalization of the information describing the user. In other examples, text information of the information describing the user may be transmitted. Further, in addition to other types of information describing the user, a stream of the recorded audio or visual information captured by the mobile computing device may be provided to the emergency response provider. For example, the emergency response module (130) may provide the information describing the user, and subsequently provide an audio or visual feed of the situation as events occur.

In some implementations, the emergency response module (130) may continue to interact with the emergency response provider. For example, the emergency response module (130) may use the voice recognition module (132) to recognize requests or other commands provided by the emergency response provider. For example, due to a poor connection, the emergency response provider may not have heard the vocalized information provided by the emergency response module (130), and the emergency response provider may ask to repeat a location, and in response to analyzing the question and determining that a location is being requested, the emergency response module (130) may provide the requested information, in this case, the location. Similarly, the emergency response module (130) may recognize and respond to other questions from the emergency response provider.

Figure 3:
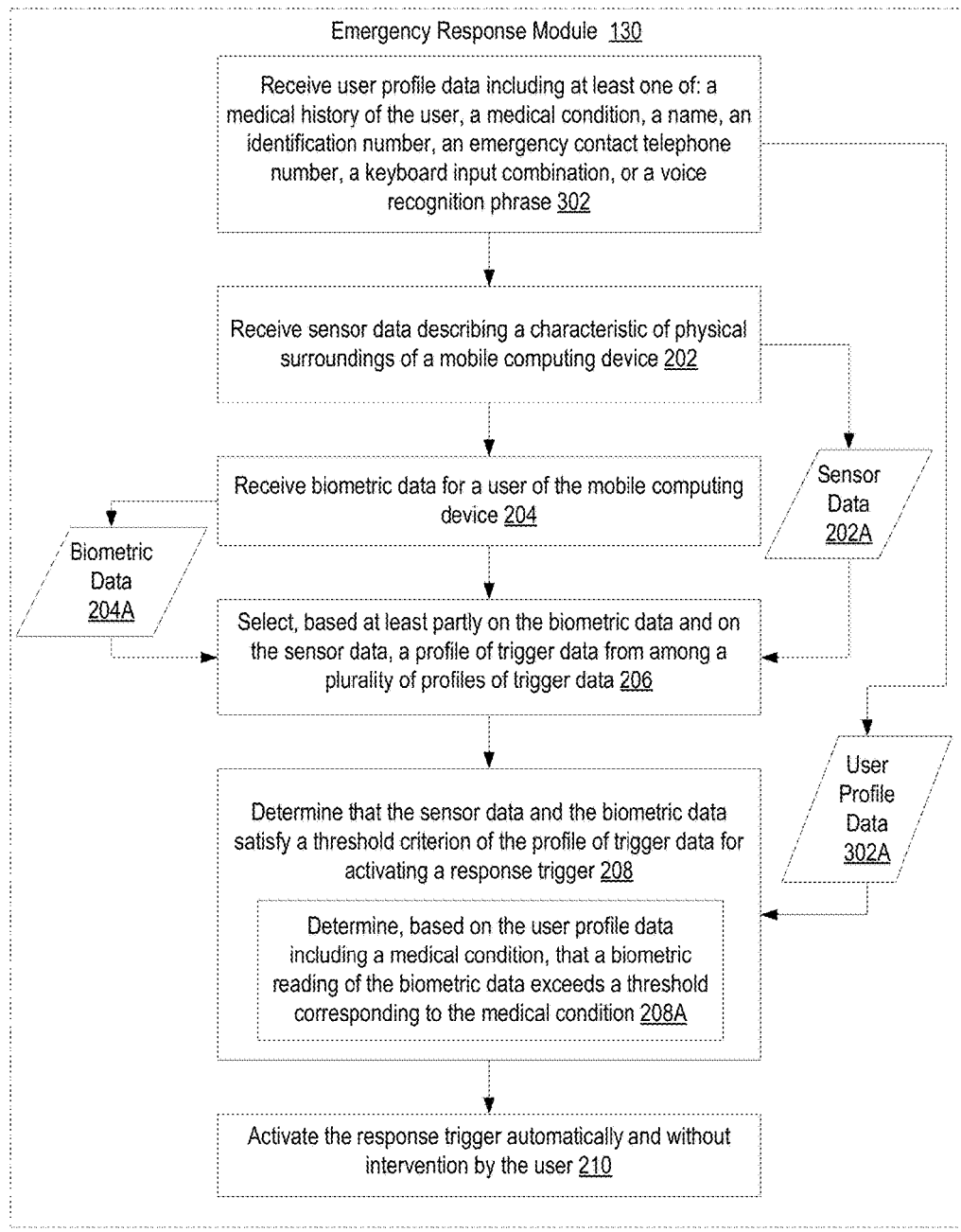
FIG. 3 illustrates a flow chart illustrating another exemplary method for calling a response provider based on detection of an emergency situation according to embodiments of the present invention.

For further explanation, FIG. 3 sets forth a flow chart illustrating another exemplary method for calling a response provider based on detection of an emergency situation according to embodiments of the present invention. The method of FIG. 3 is similar to the method of FIG. 2 in that the method of FIG. 3 includes receiving (202) sensor data describing at least one characteristic of physical surroundings of the computing device; receiving (204) biometric data for a user of the computing device; selecting (206), in dependence upon the biometric data and the sensor data, a profile of trigger data from among a plurality of profiles of trigger data; determining (208) that the sensor data and the biometric data satisfy a threshold criterion of the profile of trigger data for activating a response trigger; and in response to the determination, activating (210) the response trigger.

The method of FIG. 3 differs from the method of FIG. 2, however, in that the method of FIG. 3 includes receiving (302) user profile data. Receiving (302) user profile data (302A) may be carried out by receiving input from a user via a user interface of the mobile computing device (120), where the input specifies such information as: a medical history of the user, a medical condition, current medications, contact numbers, a name, an identification number, an emergency contact telephone number, a keyboard input combination, or a voice recognition phrase. In some implementations, some or all of the user profile data may be provided to an emergency response provider when a connection is established to the emergency response provider. Further, the user profile may include any information input by the user that the user would want to be communicated during an emergency.

Further in this example, the user profile data may be used in determining (208) whether to activate a response trigger. For example, one of the profiles of trigger data selected for the user may be a profile of trigger data corresponding to a medical condition, for example, epilepsy. In this case, the profile of trigger data may use biometric readings of the biometric data to determine changes in motion, heart rate, or other biometric readings that may correspond to a seizure, and the biometric readings may be compared against threshold criteria for the different biometric readings to determine (208A) whether the threshold criteria for recognizing a seizure, or more generally, any instance or evidence of the medical condition, are satisfied.

Figure 4:
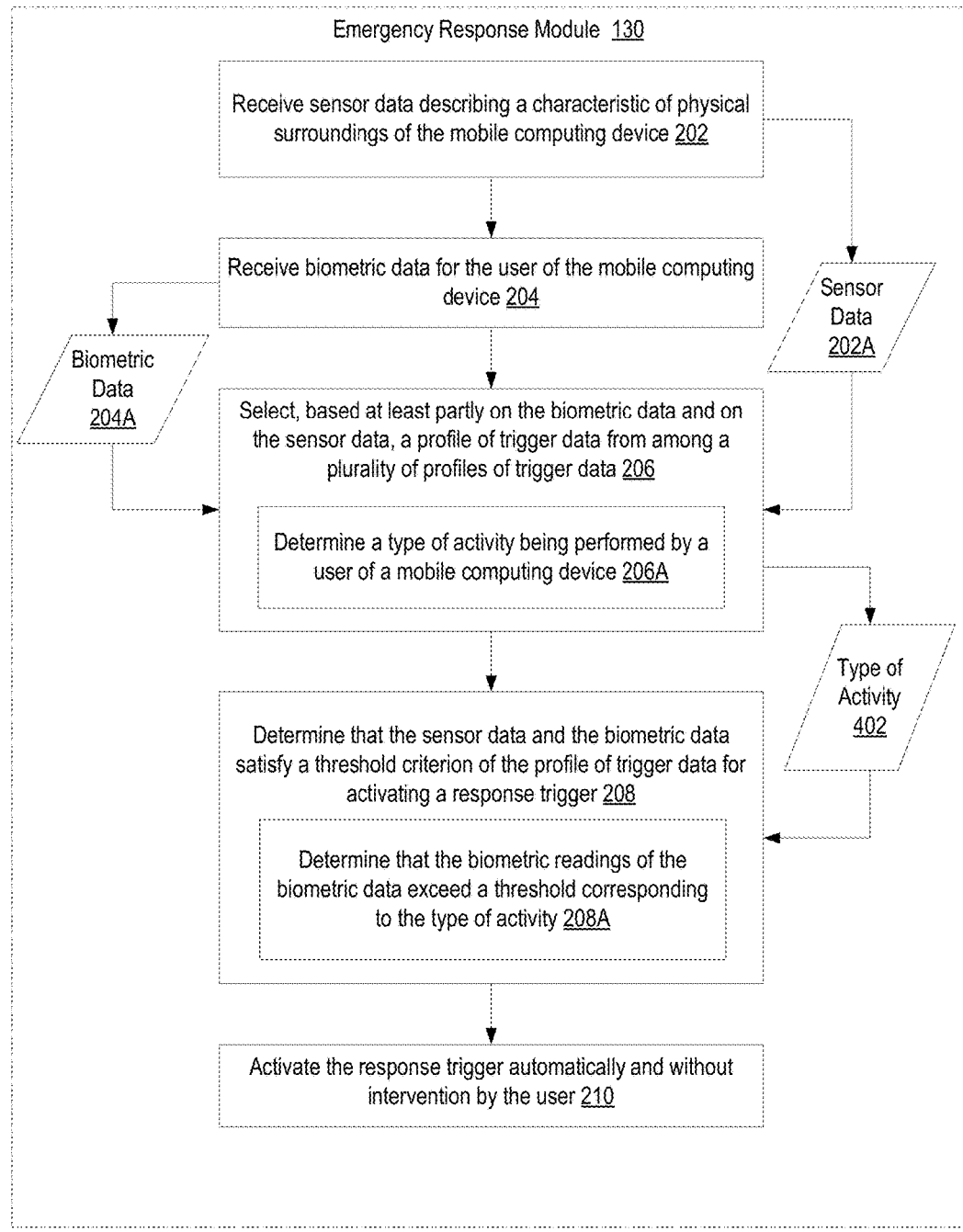
FIG. 4 illustrates a flow chart illustrating another exemplary method for calling a response provider based on detection of an emergency situation according to embodiments of the present invention.

For further explanation, FIG. 4 sets forth a flow chart illustrating another exemplary method for calling a response provider based on detection of an emergency situation according to embodiments of the present invention. The method of FIG. 4 is similar to the method of FIG. 2 in that the method of FIG. 4 includes receiving (202) sensor data describing at least one characteristic of physical surroundings of the computing device; receiving (204) biometric data for a user of the computing device; selecting (206), in dependence upon the biometric data and the sensor data, a profile of trigger data from among a plurality of profiles of trigger data; determining (208) that the sensor data and the biometric data satisfy a threshold criterion of the profile of trigger data for activating a response trigger; and in response to the determination, activating (210) the response trigger.

The method of FIG. 4 differs from the method of FIG. 2, however, in that the method of FIG. 4 includes determining (206A) a type of activity (402) being performed by the user of the mobile computing device in selecting (206) a profile of trigger data from among a plurality of profiles of trigger data. For example, as discussed above, based on a heart rate and speed, the emergency response module (130) may determine that the user is walking, and correspondingly select a profile of trigger data for walking In some cases, the emergency response module (130) may also use, or instead use, GPS information describing the user walking on a sidewalk, instead of, for example, a street.

Further in this example, determining (208) that the sensor data and the biometric data satisfy a threshold criterion of the profile of trigger data for activating a response trigger may include determining (208A) that the biometric readings of the biometric data exceed a threshold corresponding to the type of activity. Given this determination (208), the emergency response module (130) may proceed to activate (210) the response trigger to establish (210A) a connection to an emergency response provider, and provide (210A) information describing the user to the emergency response provider.

Figure 5:
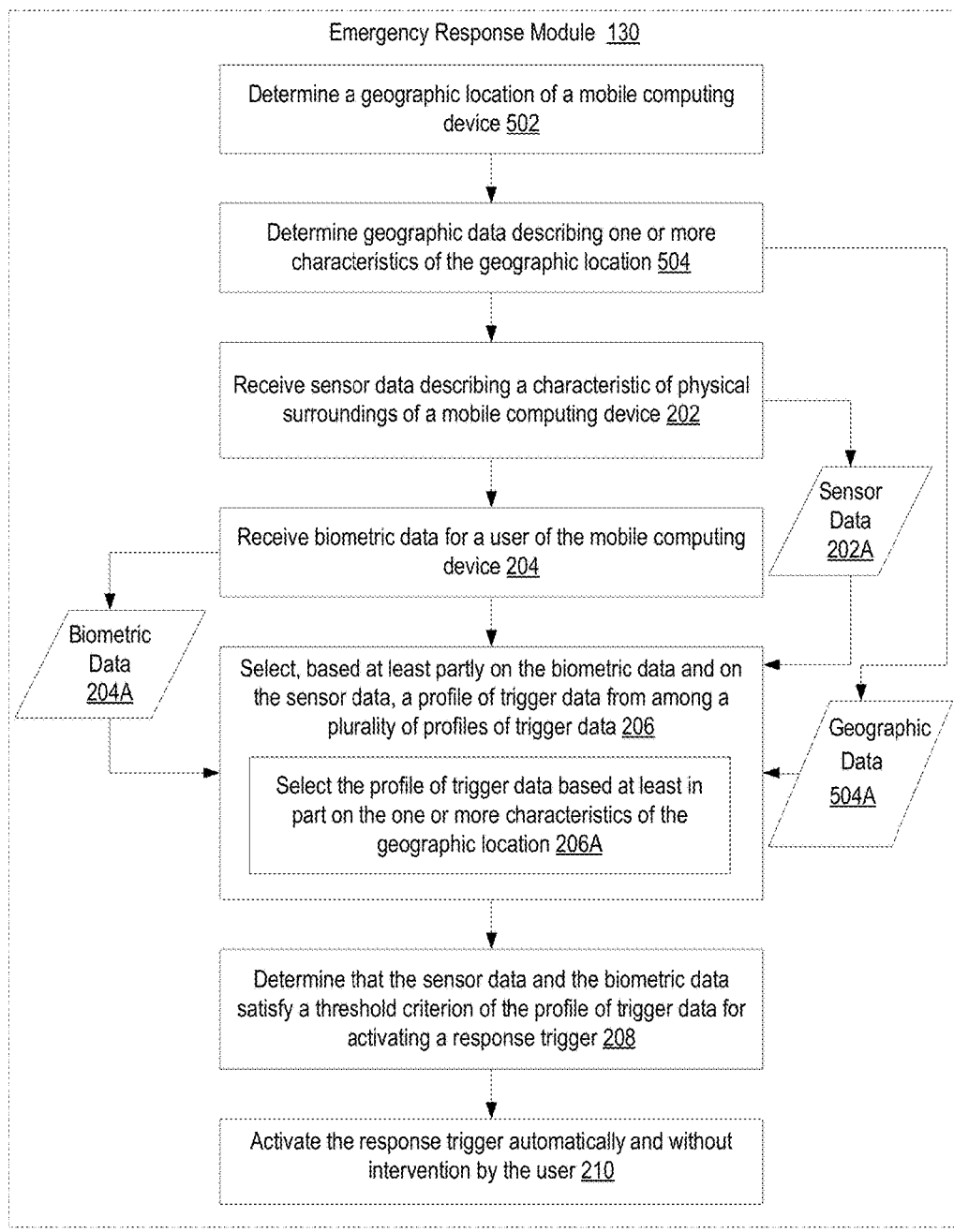
FIG. 5 illustrates a flow chart illustrating another exemplary method for calling a response provider based on detection of an emergency situation according to embodiments of the present invention.

For further explanation, FIG. 5 sets forth a flow chart illustrating another exemplary method for calling a response provider based on detection of an emergency situation according to embodiments of the present invention. The method of FIG. 5 is similar to the method of FIG. 2 in that the method of FIG. 5 includes receiving (202) sensor data describing at least one characteristic of physical surroundings of the computing device; receiving (204) biometric data for a user of the computing device; selecting (206), in dependence upon the biometric data and the sensor data, a profile of trigger data from among a plurality of profiles of trigger data; determining (208) that the sensor data and the biometric data satisfy a threshold criterion of the profile of trigger data for activating a response trigger; and in response to the determination, activating (210) the response trigger.

The method of FIG. 5 differs from the method of FIG. 2, however, in that the method of FIG. 5 includes determining (502) a geographic location of the mobile computing device (130). Determining (502) a geographic location of the mobile computing device (130) may be carried out in a variety of ways including, for example, identifying the location of the mobile computing device from GPS sensor data. In this example, it is presumed that the user and the mobile computing device (130) are in close proximity to each other. That is, the emergency response module (130) assumes that the location of the mobile computing device is the location of the user.

Continuing with this example, given the geographic location, the emergency response module (130) may determine (504) geographic data (504A) describing one or more characteristics of the geographic location. For example, as described above, a characteristic of the geographic location may be crime rate information for the particular geographic location.

Further in this example, selecting (206) the profile of trigger data from among the plurality of profiles of trigger data may include selecting (206A) the profile of trigger data based at least in part on the geographic data describing the one or more characteristics of the geographic location.

Given this selecting (206) of the profile of trigger data, the emergency response module (130) may proceed to determine (208) that the sensor data and the biometric data satisfy a threshold criterion of the profile of trigger data for activating a response trigger. Completing this example, the emergency response module (130) may proceed to activate (210) the response trigger to establish (210A) a connection to an emergency response provider, and provide (210A) information describing the user to the emergency response provider.

Figure 6:
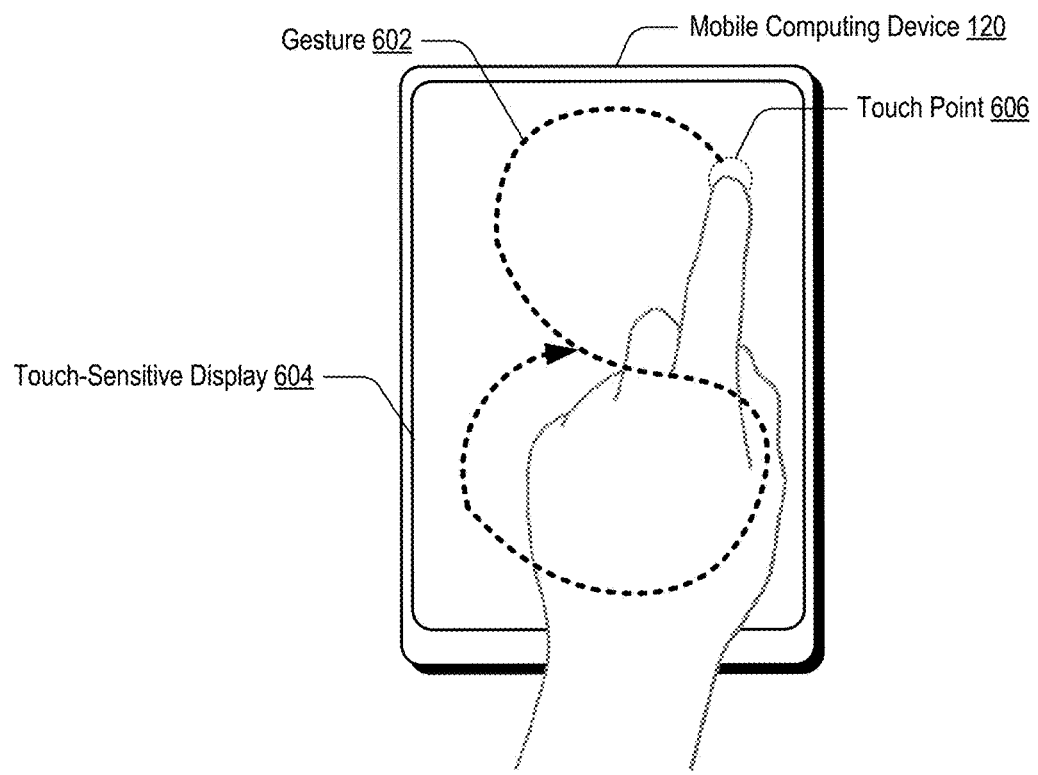
FIG. 6 illustrates an example gesture for invoking an emergency response module according to some implementations.

For further explanation, FIG. 6 illustrates a technique for invoking an emergency response module such as the emergency response module (130) set forth in the example of FIG. 1. In this example, a user of a mobile computing device (120) may perform a gesture (602) such as tracing a particular pattern on a touch-sensitive display (604). For example, the gesture may begin in response to detecting the user making contact with the touch-sensitive display at a touch point (606), and tracing the path corresponding to gesture (602). In response to determining that the gesture has been performed, the emergency response module (130) may, as described above, enter a ready state to activate the gathering of data describing the surrounding environment. In some cases, the user may provide a specific gesture for activating the emergency response module (130), where the specific gesture may be any gesture recognizable by the mobile computing device (120) using any input detection or sensors available to the mobile computing device (120). In some cases, the user may define particular phrases or voice commands for activating the emergency response module (130).

Figure 7:
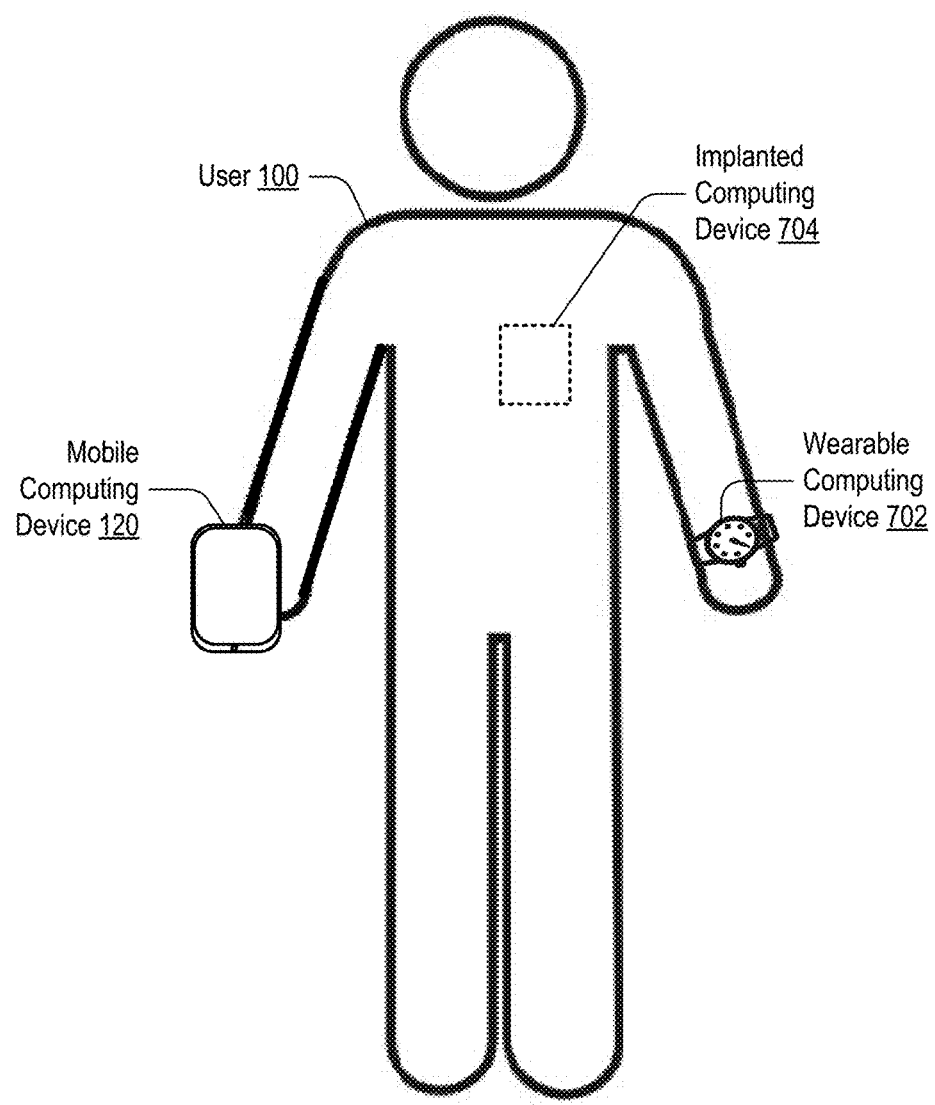
FIG. 7 illustrates different computing devices that may interface with an emergency response module according to some implementations.

For further explanation, FIG. 7 illustrates an example environment in which an emergency response module (130 in FIG. 1) may directly collect or receive from other devices, biometric data for the user of the mobile computing device (120). In this example, a user of a mobile computing device (120) may be wearing a wearable computing device (702) such as a smart watch, a fitness tracking device, or some other wearable computing device. Further, the wearable computing device (702) may periodically, aperiodically, on demand from the mobile computing device (120), or based on some event such as a change in biometric data, provide biometric data to the mobile computing device (120).

In other examples, the mobile computing device (120) may interface with and collect data from other types of devices, such as a computing device attached to a bicycle, or from a computing device within a shoe, or other types of computing devices. In this example, if the user begins using a bicycle, and the bicycle computing device is activated and begins transmitting data, the mobile computing device (120) may determine an activity type based on the type of data being received, the source of the data, or a combination of the type of data and the source. For example, the computing device for the bicycle may be paired with the mobile computing device (120), and when the mobile computing device (120) begins receiving data from the computing device for the bicycle, the mobile computing device (120) may determine that the user is riding a bicycle.

Further in this example environment, the user may also, or instead, have implanted medical devices such as an implanted computing device (704). In some examples, an implanted computing device (704) may be a pacemaker with wireless communication capability for transmitting biometric data to the mobile computing device (120). Generally, an implanted computing device (704) may be any type of medical device for detecting biometric data.

Given biometric data from a wearable computing device (702), from an implanted computing device (704), or from a combination of wearable computing devices and implanted computing devices, the emergency response module (130) may select (206) a profile of trigger data or determine (208) whether to activate a trigger response.

Figure 8:
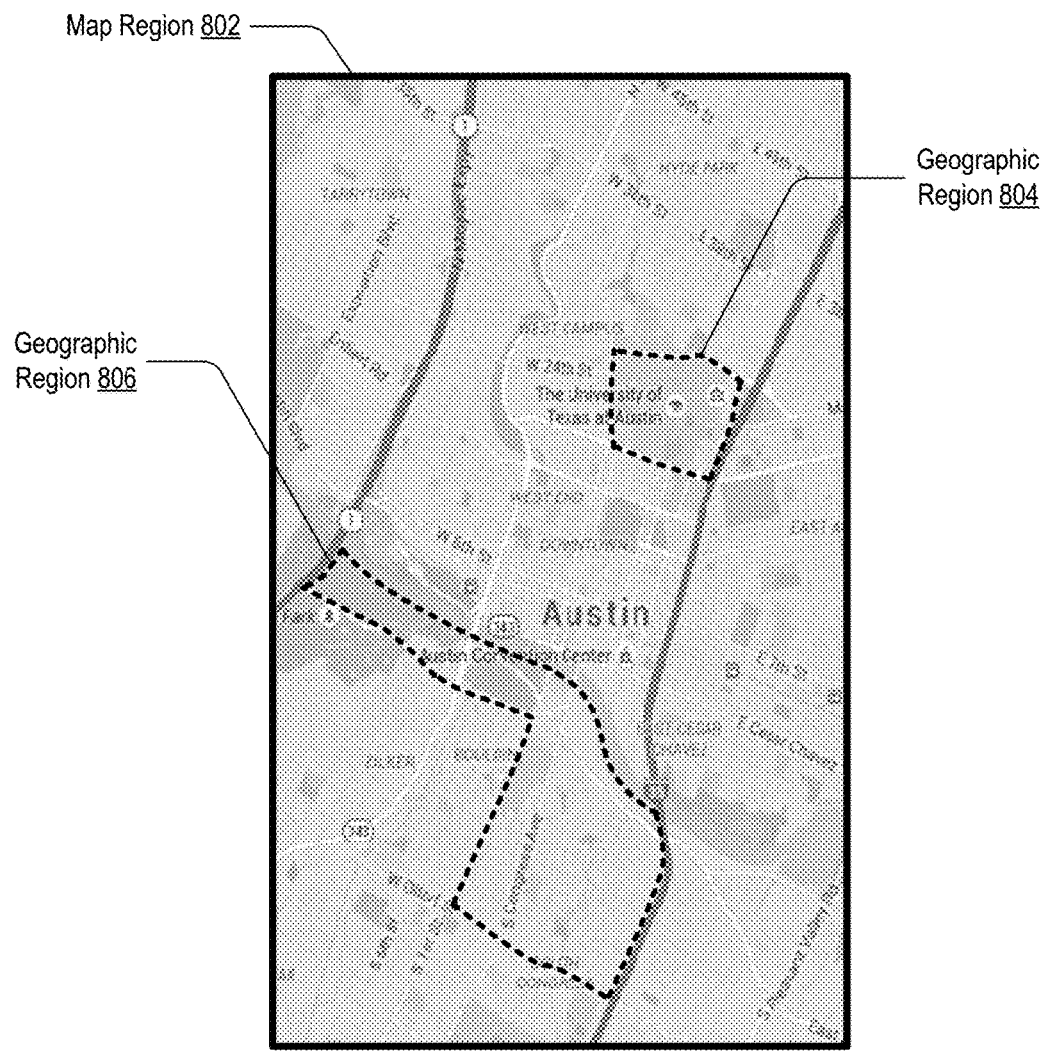
FIG. 8 illustrates an example of geographic regions that may be used to determine trigger conditions by an emergency response module according to some implementations.

For further explanation, FIG. 8 illustrates an example geographic location for which an emergency response module (130 in FIG. 1) may use or request geographic data describing characteristics of the geographic location. As discussed above with regard to FIG. 5, geographic data may include information describing crime rates. As depicted in FIG. 8, a geographic region may be any portion of a map region (802). The example map region (802) of FIG. 8 depicts a portion of the city of Austin, Tex., where two geographic regions are defined, a northern geographic region (804) and a southern geographic region (806).

In this example, as a user moves through a city, the emergency response module may request geographic data describing the current location of the mobile computing device (120 in FIG. 1) from a data analytics service. For example, using GPS data, the emergency response module (130) may provide a location to the data analytics service, and the data analytics service may provide geographic data for the location, including information describing a geographic region for which the geographic data is applicable. As described above with regard to FIG. 5, the emergency response module (130) may use this geographic data to select a profile of trigger data based at least in part on the geographic data describing characteristics of the geographic region or location.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
by first program instructions executing on a computing device:
receiving sensor data describing at least one characteristic of physical surroundings of the computing device;
receiving biometric data for a user of the computing device;
selecting, in dependence upon the biometric data and the sensor data, a profile of trigger data from among a plurality of profiles of trigger data including determining, based on sensor data, a type of activity being performed by the user of the computing device, wherein the different profiles of trigger data correspond to different types of activity;
determining that the sensor data and the biometric data satisfy a threshold criterion of the profile of trigger data for activating a response trigger including determining that one or more biometric readings of the biometric data exceed a threshold corresponding to the type of activity; and
in response to the determination, activating the response trigger, including automatically and without the user's intervention:
establishing a connection to an emergency response provider; and
providing information describing the user to the emergency response provider.

2. The method of claim 1 further comprising:
receiving user profile data comprising at least one of a plurality of components including: a medical history of the user, a medical condition, a name, an identification number, an emergency contact telephone number, a keyboard input combination, or a voice recognition phrase.

3. The method of claim 2, wherein the information describing the user includes one or more of the components of the user profile data.

4. The method of claim 2, wherein the user profile data includes the medical condition, and wherein determining that the sensor data and the biometric data satisfy the threshold criterion further comprises:
determining that one or more biometric readings of the biometric data exceed a threshold corresponding to the medical condition.

5. The method of claim 1, wherein selecting the profile of trigger data further comprises:
determining a geographic location of the computing device;
determining geographic data describing one or more characteristics of the geographic location; and
selecting the profile of trigger data based at least in part on the geographic data.

6. The method of claim 1, wherein establishing the connection to an emergency response provider is performed without performing steps for establishing a telephone call through a telephone user interface provided by the computing device.

7. A computing device comprising a computer processor, a computer memory operatively coupled to said computer processor, said computer memory having disposed within it computer program instructions that, when executed by said computer processor, cause said computing device to carry out the steps of:
receiving sensor data describing at least one characteristic of physical surroundings of the computing device;
receiving biometric data for a user of the computing device;
selecting, in dependence upon the biometric data and the sensor data, a profile of trigger data from among a plurality of profiles of trigger data including determining, based on sensor data, a type of activity being performed by the user of the computing device, wherein the different profiles of trigger data correspond to different types of activity;
determining that the sensor data and the biometric data satisfy a threshold criterion of the profile of trigger data for activating a response trigger including determining that one or more biometric readings of the biometric data exceed a threshold corresponding to the type of activity; and
in response to the determination, activating the response trigger, including automatically and without the user's intervention:
establishing a connection to an emergency response provider; and
providing information describing the user to the emergency response provider.

8. The computing device of claim 7, further comprising computer program instructions that, when executed by said computer processor, cause said computing device to carry out the step of:
receiving user profile data comprising at least one of a plurality of components including:
a medical history of the user, a medical condition, a name, an identification number, an emergency contact telephone number, a keyboard input combination, or a voice recognition phrase.

9. The computing device of claim 8, wherein the information describing the user includes one or more of the components of the user profile data.

10. The computing device of claim 7, wherein the user profile data includes the medical condition, and wherein determining that the sensor data and the biometric data satisfy the threshold criterion further comprises:
determining that one or more biometric readings of the biometric data exceed a threshold corresponding to the medical condition.

11. The computing device of claim 7, wherein selecting the profile of trigger data further comprises:
determining a geographic location of the computing device;
determining geographic data describing one or more characteristics of the geographic location; and
selecting the profile of trigger data based at least in part on the geographic data.

12. A computer program product disposed upon a non-transitory computer readable medium, said computer program product comprising computer program instructions that, when executed, cause a computing device to carry out the steps of:
- receiving sensor data describing at least one characteristic of physical surroundings of the computing device;
- receiving biometric data for a user of the computing device;
- selecting, in dependence upon the biometric data and the sensor data, a profile of trigger data from among a plurality of profiles of trigger data including determining, based on sensor data, a type of activity being performed by the user of the computing device, wherein the different profiles of trigger data correspond to different types of activity;
- determining that the sensor data and the biometric data satisfy a threshold criterion of the profile of trigger data for activating a response trigger including determining that one or more biometric readings of the biometric data exceed a threshold corresponding to the type of activity; and
- in response to the determination, activating the response trigger, including automatically and without the user's intervention:
  - establishing a connection to an emergency response provider; and
  - providing information describing the user to the emergency response provider.

13. The computer program product of claim 12, wherein said computer readable medium comprises a storage medium.

14. The computer program product of claim 12, further comprising computer program instructions that, when executed, cause the computing device to carry out the step of:
- receiving user profile data comprising at least one of a plurality of components including: a medical history of the user, a medical condition, a name, an identification number, an emergency contact telephone number, a keyboard input combination, or a voice recognition phrase.

15. The computer program product of claim 12, wherein the information describing the user includes one or more of the components of the user profile data.

16. The computer program product of claim 12, wherein the user profile data includes the medical condition, and wherein determining that the sensor data and the biometric data satisfy the threshold criterion further comprises:
- determining that one or more biometric readings of the biometric data exceed a threshold corresponding to the medical condition.

* * * * *